United States Patent [19]

Schaefer

[11] Patent Number: 5,236,391
[45] Date of Patent: Aug. 17, 1993

[54] FLUSH-MOUNTED AIR INTAKE

[76] Inventor: Ronald E. Schaefer, 514 Tenth Street No., Sartell, Minn. 56377

[21] Appl. No.: 861,241

[22] Filed: Mar. 31, 1992

[51] Int. Cl.$^5$ ............................................. F24F 13/10
[52] U.S. Cl. .................................. 454/253; 454/259; 454/270
[58] Field of Search ............... 454/253, 254, 249, 260, 454/270, 271, 307

[56] References Cited

U.S. PATENT DOCUMENTS

| | | |
|---|---|---|
| 518,984 | 5/1894 | Zimmerman . |
| 983,179 | 1/1911 | Swift . |
| 1,447,776 | 3/1923 | Friedman et al. . |
| 1,532,505 | 4/1925 | Lyon . |
| 2,565,122 | 8/1951 | Cowan . |
| 3,138,086 | 6/1964 | Rigterink et al. . |
| 3,299,798 | 1/1967 | Nabben ............... 454/259 |
| 4,448,373 | 2/1985 | Dittmer et al. ......... 454/253 |
| 4,686,890 | 8/1987 | Stouffer et al. . |
| 4,794,852 | 1/1989 | Ee ...................... 454/271 |
| 4,811,656 | 3/1989 | Meendering ........ 454/307 X |
| 4,823,679 | 4/1989 | Robbins ................ 454/253 |
| 4,850,265 | 7/1989 | Raisanen . |
| 5,088,388 | 2/1992 | Schaefer ............ 454/270 X |

FOREIGN PATENT DOCUMENTS

| | | |
|---|---|---|
| 5084 | 12/1905 | France . |
| 2308873 | 11/1976 | France . |
| 1514459 | 9/1974 | United Kingdom . |

OTHER PUBLICATIONS

Pamphlet: Del-Air C-Series Center Air Inlet, Del-Air Systems Ltd. (Canada): Del-Air Americas Ltd. (USA).
Pamphlet: Raydot Fresh Air Inlets, Raydot Total Ventilation Systems.
Pamphlet: Pruden Automatic Ceiling Inlet Mod. No. A-750 and A-1200, Pruden Airstream.
Pamphlet: Del-Air Side Air Inlet, Del-Air Systems Model Nos. 116 and 124.
Pamphlet: Automatic Wall Inlet Model AWC-1000 Pruden Airstream, Pruden Products, Inc.
Pamphlet: AAA Associates Inc. Var-Vent Air Controller.
Pamphlet: Agri-Aide Valve Controlled Air-Intakes Model Nos. LI 400 et al.
Pamphlet: Vent-O-Matic Air-Balancer Air Inlet System Ceiling and Side Wall Models.
Pamphlet: AAA Associates Inc. Adjust-A-Baffle

*Primary Examiner*—Harold Joyce
*Attorney, Agent, or Firm*—Palmatier, Sjoquist & Helget

[57] ABSTRACT

A corrosion-free, condensation-free, flush-mounted automatic air intake has a rectangular plastic frame insertable into an agricultural building ceiling or wall opening and fastenable thereat. The frame has a flange therearound for mounting and supporting an attic or wall housing forming an insulation barrier. The housing may also be integral with the frame flange. A lip extends outwardly from the frame and engages the room side of the ceiling or wall for fastening thereat in a flush-mount arrangement. The frame has a central frame or baffle opening for permitting fresh air to pass therethrough. An inwardly projecting flange is on the frame around the opening forming a baffle seat. A baffle is pivotally mounted and adapted to rest in the baffle seat flush with the frame, to close the baffle opening and to swing outwardly to permit air to pass through the intake and into the room under the influence of the building exhaust fan.

16 Claims, 4 Drawing Sheets

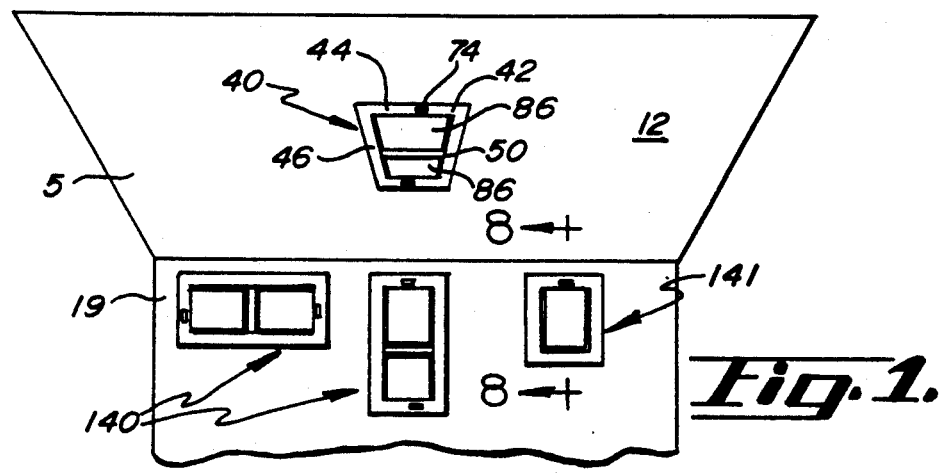
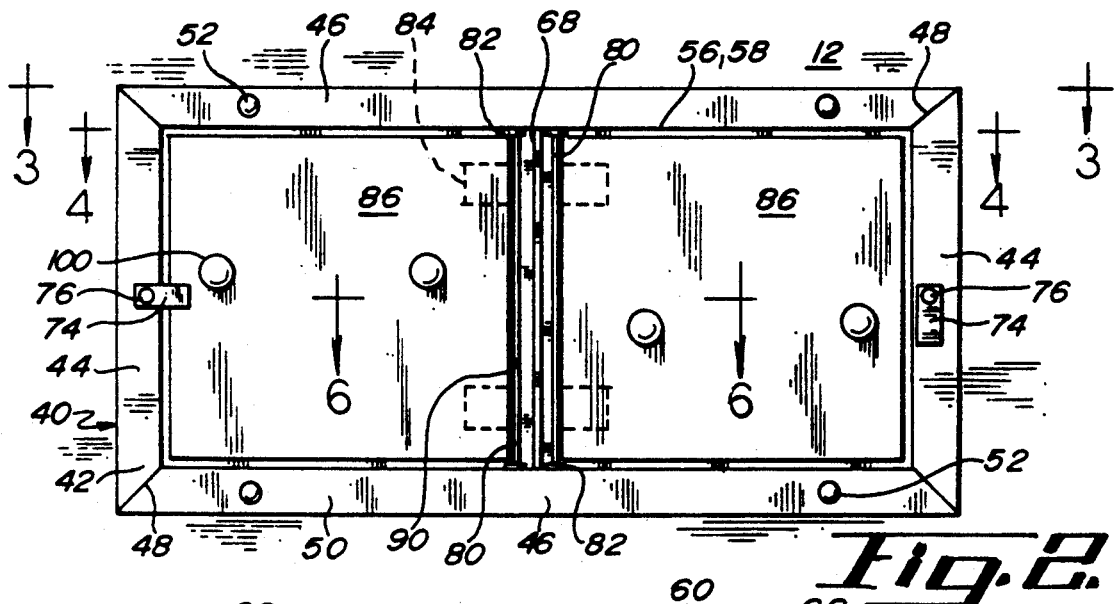
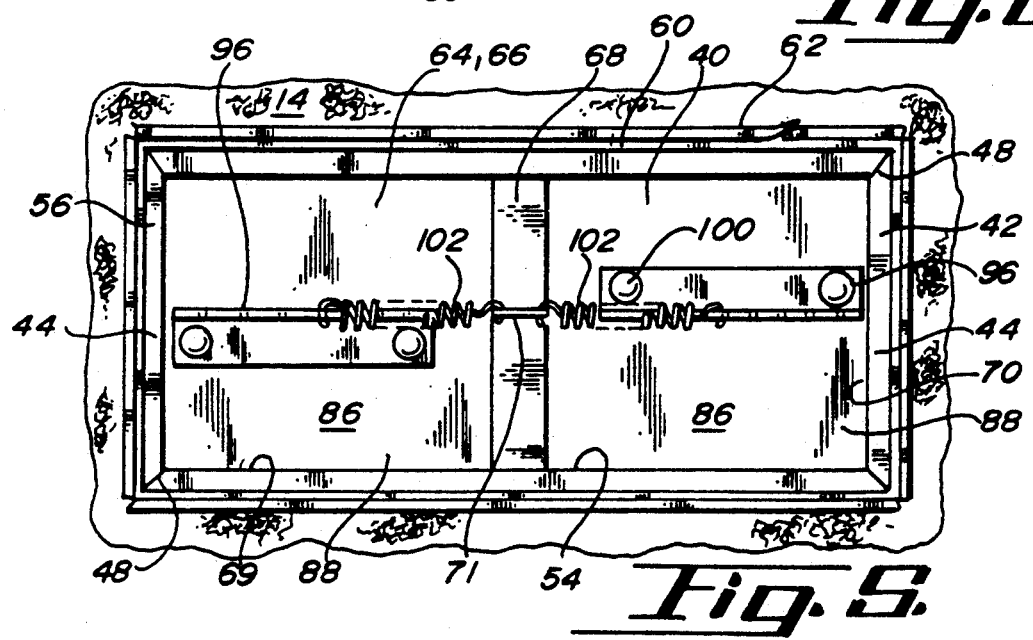

FLUSH-MOUNTED AIR INTAKE

BACKGROUND OF THE INVENTION

This invention relates to an all season, corrosion-free, condensation-free, flush-mounted automatic ceiling air intake for agricultural buildings.

Agricultural buildings generally have a well ventilated attic, a room below the attic for animals, a ceiling between the attic and the room, and an exhaust fan in the building to remove stagnant and putrid air from the room. The air intake is adapted to permit large capacities of fresh air from the attic to be drawn through the intake into the room under the influence of the building exhaust fan. The air intake of the present invention with its flush-mount design will also work well in a wall mount arrangement drawing fresh air into the room from outside of the building.

It is well known that seasonal problems occur in controlling the atmosphere within poultry, dairy, hog, calf, cattle and horse barns or buildings. The air within such buildings becomes stagnant and ridden with ammonia and moisture—all detrimental the health, growth and production of the animals. In the summer it is necessary to cool the buildings to prevent heat stress, to control flies and flying insects, and to maintain production levels of animals otherwise exposed to high temperatures. In the winter, agricultural buildings are typically plagued with inconsistent air temperatures throughout the building and cold air drafts which may be detrimental to poultry and animals. Further still, the ceilings, walls and floors of agricultural buildings in the winter are often damp with moisture or condensation.

In the past, agriculturalists have used integrated systems of variable speed exhaust fans, suitably operated by thermostatically controlled speed modulators, together with air intakes. Air intakes react to the withdrawal of air within the building by exhaust fans as well as the static pressure changes associated with enclosed buildings as they let fresh air into the buildings. Such systems may use high velocity air exchange and circulation for cooling in the summer and gentle draft-free air exchange and air movement during the winter months.

There are many styles and sizes of known air intakes. There are intakes that are to be installed in the ceiling, wall, and at the juncture of the ceiling and wall Intakes also come in large and small capacities. Small capacities may be considered to move 600 to 800 cubic feet per minute while large capacity intakes move between 1,200 and 1,500 cubic feet per minute. While small capacity air intakes are suitable for small buildings, large capacity intakes are more appropriate for large buildings otherwise requiring a multitude of small air intakes for adequate air exchange and distribution.

Known intakes are plagued with a variety of problems, however. Materials from which known intakes are constructed are often subject to corrosion due to the moisture and putrid atmosphere often associated with agricultural buildings. Such materials are also subject to condensation forming upon the intakes which further promotes corrosion. Virtually all known intakes jut into the room of the buildings in which they are installed. Consequently, buildings with confining walls and low ceilings pose an intake obstruction or clearance problem for both the farmer and the animals. With portions of the air intake jutting into the room of the building, they are further subject to corrosion and condensation resulting from exposure to the moisture and other gases within the room. Furthermore, these known intakes are not fully automatic in that they require manual setting which must be seasonally adjusted.

There is a need for a corrosion-free, condensation-free, flush-mounted automatic air intake for agricultural buildings. Such an intake should be under the influence of a building exhaust fan and be capable of automatically permitting large capacities of fresh air from the attic to be drawn through the intake into the room of the building to blend and mix fresh air and building air, to cool poultry and livestock, to keep ceilings, walls and floors moisture free, to keep the buildings smelling fresh and ammonia free and to promote consistent air temperature throughout the buildings from floor to ceiling while yet not producing any obstruction within the room that might jut out from the ceiling or walls.

SUMMARY OF THE INVENTION

A corrosion-free, condensation-free, flush-mounted automatic air intake has a rectangular plastic frame insertable into an agricultural building ceiling or wall opening and fastenable thereat. The frame has a flange therearound for mounting and supporting an attic or wall housing forming an insulation barrier. The housing may also be integral with the frame flange. A lip extends outwardly from the frame and engages the room side of the ceiling or wall for fastening thereat in a flush-mount arrangement. The frame has a central frame or baffle opening for permitting fresh air to pass therethrough. An inwardly projecting flange is on the frame around the opening forming a baffle seat. A baffle is pivotally mounted and adapted to rest in the baffle seat flush with the frame, to close the baffle opening and to swing outwardly to permit air to pass through the intake and into the room under the influence of the building exhaust fan.

A principal object and advantage of the present invention is that the air intake is flush-mounted with the ceiling or wall thereby giving a neat, clean appearance not in any way interfering with overhead or side wall clearances in confining agricultural buildings.

Another principal object and advantage of the present invention is that the air intake is totally corrosion free in that it is made of components that are not subject to the deleterious effects of moisture or chemical gases.

Another object and advantage of the present invention is that its flush-mount arrangement subjects the intake to even less condensation problems in that the majority of the structure is in the ceiling or wall.

Another object and advantage of the present invention is that it permits large capacities of air exchange from the outside or attic, through the air intake and into the room under the influence of an exhaust fan offering little resistance to air flow which is also adjustable.

Another object and advantage of the present invention is that projects air incoming the room into opposite directions to blend and mix fresh air with the building air and to promote a consistent air temperature throughout the building from floor to ceiling.

Another object and advantage of the present invention is that it requires no manual adjustment and is fully automatic.

Another principal object and advantage of the present invention is that it is constructed out of extremely inexpensive materials and is readily assembled and installed in easy fashion. The components also permit compact shipping.

BRIEF DESCRIPTION OF THE DRAWINGS

FIG. 1 is an upward perspective room view of the ceiling and wall of an agricultural building having air intakes of the present invention;

FIG. 2 is a plan view of the air intake flush-mounted within a ceiling opening;

FIG. 5 is a top plan view of the air intake mounted in the ceiling opening taken along lines 5—5 of FIG. 3;

DETAILED DESCRIPTION OF THE PREFERRED EMBODIMENT

Figure 6:
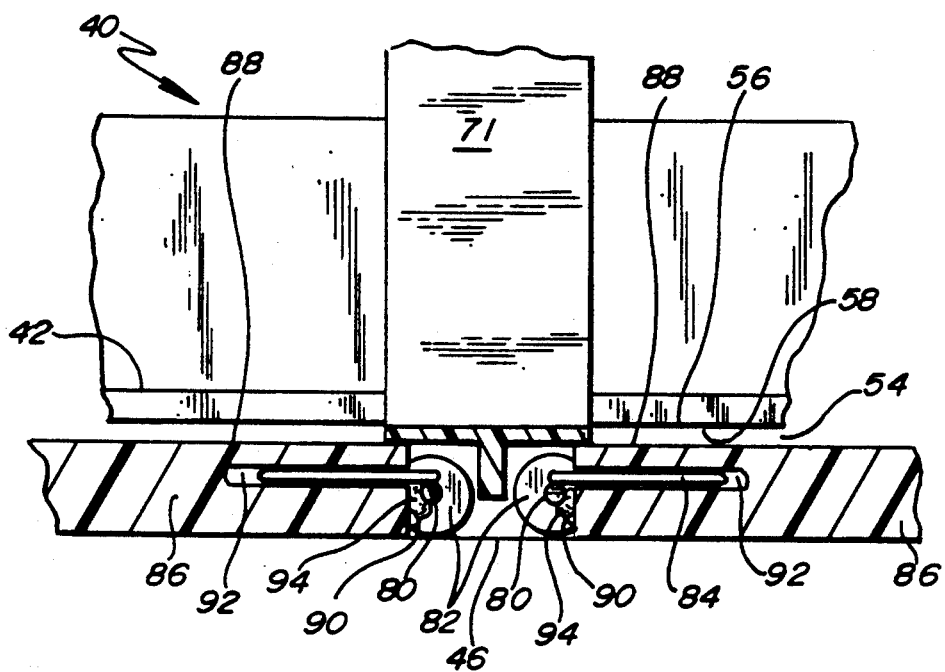
FIG. 6 is a detailed cross-sectional view taken along lines 6—6 of FIG. 2 partially broken away to show the mounting of the baffles.

Referring to FIGS. 1-7, a farm building 5 typically has a well ventilated attic 10 which operates as a fresh air plenum having soffits and ridge vents which permit outside air to enter the attic. The attic 10 is divided from the rest of the farm building 5 by the ceiling 12 which typically has insulation 14 on its top side. For any ceiling mounted air intake to operate in a farm building 5, an opening 16 must be made through the ceiling 12 with the insulation 14 parted or cutaway from the opening 16. Naturally, the opening 16 is bounded by its periphery 18 which permits attic 10 to communicate through opening 16 into room 20 below the ceiling 12.

As seen in the Figures, the flush-mounted ceiling air intake 40 of the present invention is generally comprised of a rectangular frame 42 fastenable within the ceiling opening 16 and supporting an upwardly projecting attic housing 62. The frame 42 has a recessed baffle seat 58 around two baffle openings 69 and 70. Biased baffles 86 sit within the baffle seats 58 and swing downwardly and outwardly to permit air to pass from the attic 10, through the air intake 40 and into the lower room 20.

More specifically, the rectangular frame 42 is generally comprised of short and elongate opposing side pieces 44 and 46 suitably extruded from polyvinylchloride (PVC) material having 45° cut ends 48. PVC is relatively inexpensive material. With pieces 44 and 46 aligned in a rectangular shape, ends 48 may then be sonic welded together to form the rectangular frame 42.

The rectangular frame 42 has an outwardly extending flush-mount ceiling lip 50 which appropriately permits the flush fit on the room side of the ceiling 12. Along the elongate side pieces 46 appropriately are screw aperture and hardware combinations 52 permitting the frame 42 to be fastened to the ceiling 12. By this arrangement, the frame 42 is fitted into opening 16 as to permit the frame 42 to be adjacent the opening periphery 18 of the ceiling 12 with a slight space 51 between the frame 42 and the ceiling opening periphery 18, as will be appreciated later.

Centrally within the rectangular frame 42 is located the frame opening 54. On the interior side of the frame 42 along the opening 54 is located a recessed, inwardly projecting flange 56 which forms a baffle seat 58. Extending upwardly from the frame 42 is an attic housing flange 60.

An attic housing 62 is suitably used with the air intake 40 of the present invention. The attic housing 62 appropriately sits in the space 51 between the frame 42 and ceiling opening periphery 18 as it is mounted on the attic housing support flange 60. The housing 62 appropriately has an open top 64 and an open bottom 66 to permit air to pass from the attic 10 (Arrow Ai) and through the air intake 40 (Arrow Ao) while the attic housing 62 prohibits the attic insulation 14 from falling into the air intake 40 and room 20 under the influence of exchanging air flowing from the attic 10 into the room 20.

The attic housing 62 appropriately may be made of a corrugated-like or closed cell plastic which suitably may be extruded. The housing 62 constructed of this material will readily fold upon any edge that is scored into the extruded plastic for easy shipping as well as the formation of a close fitting rectangular attic housing 62 of substantially light and inexpensive material performing the function of an insulation curb or barrier.

The frame opening 54 appropriately has an intermediate opening cross member 68 extending across elongate sides 46 and appropriately may be sonic welded or glued to the frame 42 at the baffle seat 58 substantially as shown. The cross member 68 thereby forms two substantially equal baffle openings 69 and 70. Extending upward from the top side of the cross member 68 is a spring mount peg 71 having two opposing apertures 72 near its upper portion. These apertures 72 are suitable for anchoring a spring 102 as will be discussed later.

Figure 3:
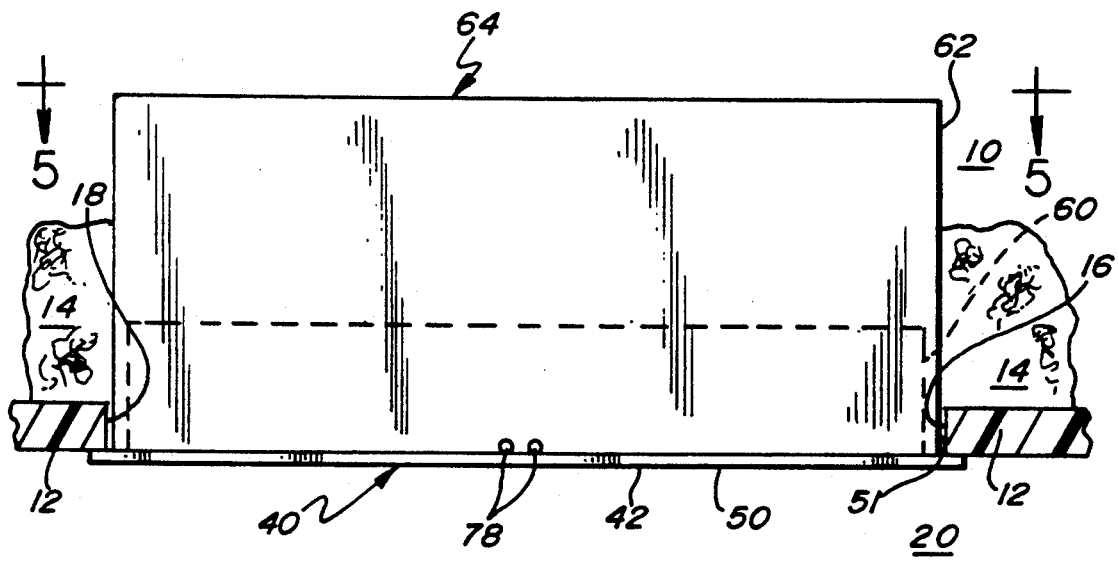
FIG. 3 is a side elevational view taken along lines 3—3 of FIG. 2.
Figure 4:
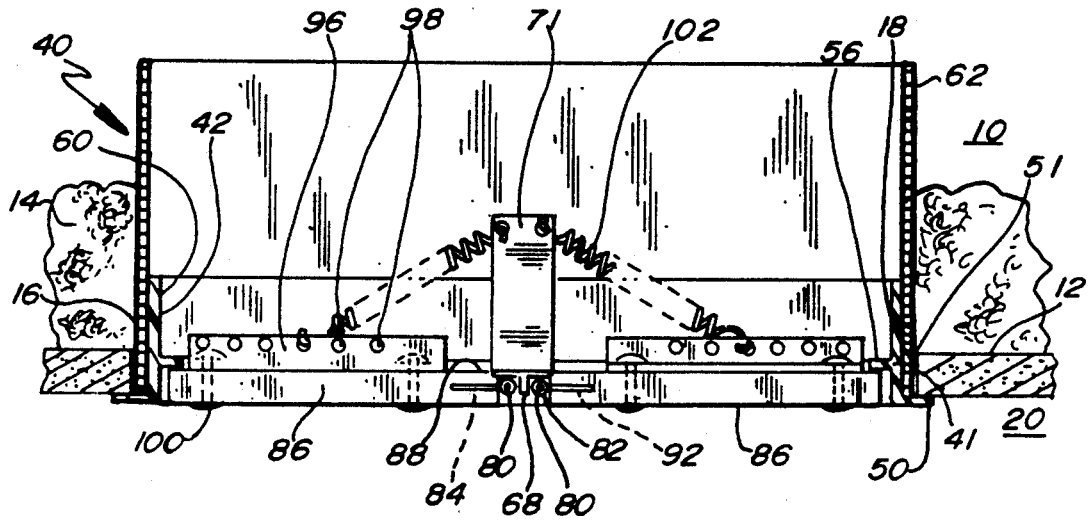
FIG. 4 is a side elevational view taken along lines 4—4 of FIG. 2.
Figure 7:
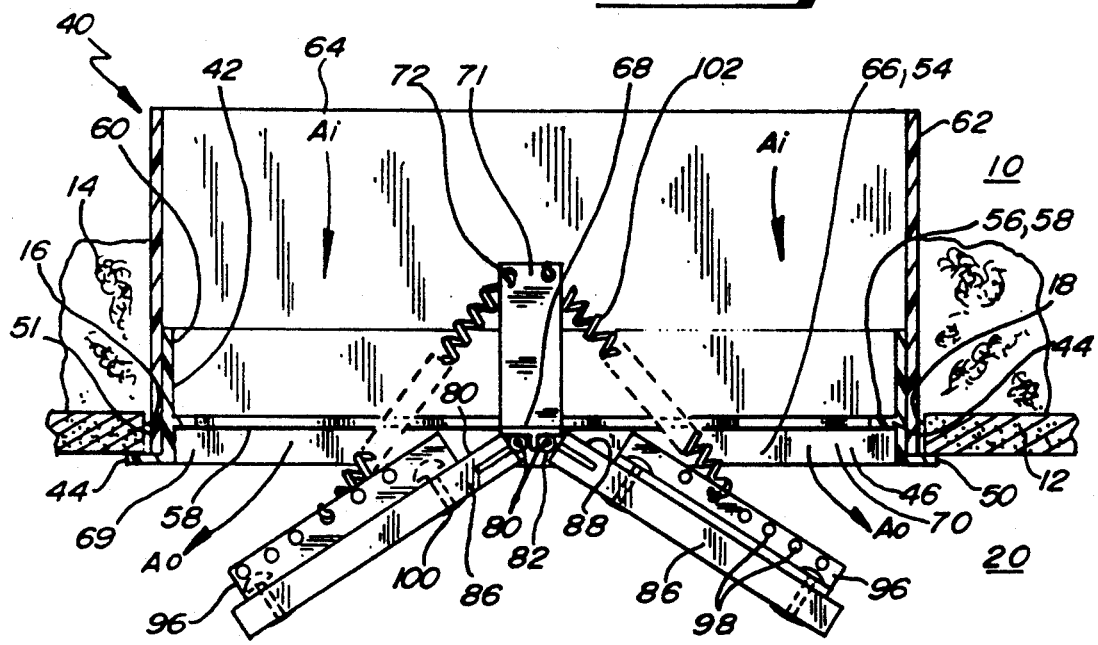
FIG. 7 is a side elevational view similar to FIG. 4 with the baffles in their partially open position.

As is visible in FIGS. 2 and 3, the rectangular frame 42 appropriately may have baffle lock tabs 74 appropriately fastened to the rectangular frame 42 along short side pieces 44 by screws or rivets 76. By this arrangement, the baffle lock tabs 74 may be swung into the baffle openings 69 or 70 to obstruct and secure the baffles 86 within the baffle seat 58. Alternatively, the tab 74 may be swung as to be parallel with the short side pieces 44 to freely permit the outward or downward pivotal swinging motion of the baffles 86 as will be appreciated.

Intermediate of the elongate side pieces 46 within the baffle seat 58 area are located pivot pin apertures 78 as shown in FIG. 3. The apertures 78 appropriately support two opposing pivot pins 80 which are parallel to each other. The pins suitably may be made of stainless steel as to be free of corrosion. As the pins 80 are located within apertures 78, retainer rings 82 capture the pivot pins 80 within the baffle seat 58. The retainer rings 82 appropriately may be made of a nylon-like material also to be free of corrosion. Baffle mounting plates 84 also may be made of stainless steel and may be suitably welded intermediately on the pivot pins 80.

Baffles 86 appropriately may be made of styrofoam and have an inward side 88 and an inner edge 90. Styrofoam has good insulation qualities and is relatively free of condensation problems. A plate mounting slit 92 is appropriately along the inner edge 90 and suitably receives the intermediate baffle mounting plates 84 for securing the baffles 86 to the pivot pins 80. Glue 94 may also be added at this location for further securing the pins 80, mounting plates 84 and the styrofoam baffles 86 together.

On the inward side 88 of baffles 86 are appropriately mounted adjustable spring mount brackets 96 which have an array of apertures 98 along their respective top edges. Plastic rivets 100 suitably mount the brackets 96 to the baffles 86. By this arrangement springs 102 may be adjustably mounted between any of the apertures 98 of the mounting brackets 96 and the apertures 72 of the spring mount peg 71 of the cross member 68.

Installation of the air intake 40 is relatively simply after the ceiling opening 16 has been formed and insulation 14 is moved away from the opening 16. The attic housing 62 is appropriately formed into its rectangular shape and slid over the housing support flange 60 until it rests on the ceiling lip 50. Thereafter, the air intake 40 and housing 62 is raised up into the opening 16 until the ceiling lip 50 engages the room side of the ceiling 12. By this arrangement the attic housing 62 fits within the space 51 between the frame 42 and the ceiling opening periphery 18. The intake 40 is suitably secured or fastened to the ceiling 12 as by screws or the like mounted in apertures 52 into the ceiling 12. The appropriate or desired tension is then set for the baffles 86 by connecting springs 106 in the appropriate apertures 98 of the spring mounting bracket 96. Naturally, the more tension springs 102 are under, the more resistive they are to the flow of air from the attic 10 into the room 20 therebelow. Thereafter, the air intake 40 is completely automatic and flush with the respect to the ceiling 12.

The present air intake is suitable to permit large capacities of air to pass therethrough. This is because there are no restrictions within the intake 40. It is important, however, that the exhaust fan have a cubic foot per minute rating comparable to the combined ratings of all the air intakes 40 mounted in the ceilings 12 as to assure proper operation. With thermostatically controlled speed modulators on the exhaust fans, their operation simply and automatically draws the baffles 86 downwardly and outwardly to permit air to flow into the room 20 from the fresh air plenum or well ventilated attic 10 above. By this operation, fresh air is delivered into the building permitting air exchange and circulation for cooling in the summer and gentle draft free air exchange and movement during the winter months.

Figure 8:
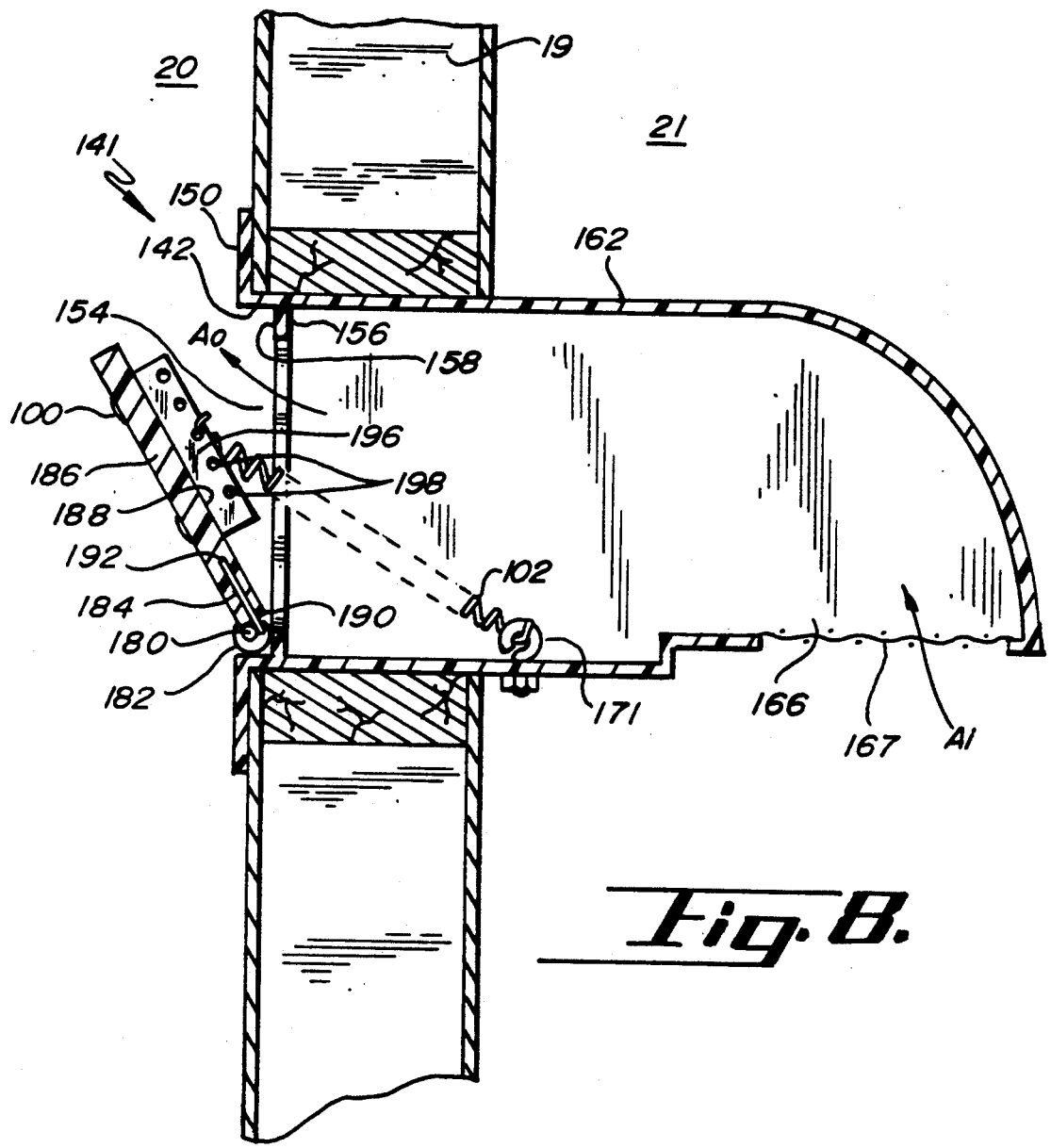
FIG. 8 is a side elevational view taken along lines 8—8 of FIG. 1 showing a wall-mounted air intake.

FIG. 8 shows a slightly modified flush-mounted wall intake 141 from FIG. 1 which will readily fit within the wall 19 of a building 5. Wall 19 divides the outside 21 from the room 20. Wall intakes 40 may have two baffles oriented horizontally or vertically as shown in FIG. 1. FIG. 8 is a cross sectional view of a single baffle intake 141.

The rectangular frame 142 and other component parts of the wall air intake 141 are very similar or analogous to that of the ceiling intake 40 or wall intakes 140. The frame 142 has an outwardly extending lip 150 which is designed to mate or engage with the inside of the wall 19 in a flush style arrangement. The frame 142 has a central frame or baffle opening 154 wherein is recessed inwardly projecting flange 156 which forms the baffle seat 158. Extending rearwardly from the rectangular frame 142 is housing 162 which may be integral with frame 142. The housing 162 has a downward and rearward turn where it opens into the bottom air inlet or opening 166 covered by a bird screen 167.

Within the housing 162 is a spring mount 171 suitably of an eye bolt construction. Pivot pin 180 extends across the baffle seat 158 at either of the seat's upper or lower portions. Pivot pin 180 is interlocked thereat with retainer rings 182. Pin 180 may also have baffle mounting plates 184 which may be fastenably inserted into plate mount slit 192 along the inner edge 190 of baffle 186.

Along the inward side 188 of baffle 186 is appropriately mounted an adjustable spring mount bracket 196 having apertures 198 there along. Bracket 196 is fastened to baffle 186 suitably by plastic rivets 100. Spring 102 adjustably connects between the spring mount 177 and any of the apertures 198 of the bracket 196.

In operation, the incoming air (Arrow Ai) from the outside 21 passes through the wall mounted air intake 140 under the influence of an exhaust fan into the building (Arrow Ao). The incoming air pushes the styrofoam baffle 186 out of its baffle seat 158 in a pivotal manner thereby directing the air upwardly as shown in FIG. 8. Should the baffle 186 be pivotally mounted along its top edge, the air coming out of the intake 140 would be directed downwardly toward the floor. Upon the shut off of the exhaust fan, the baffle 186 will then return to its baffle seat 158 under the influence of biasing spring 102.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A corrosion-free, condensation-free, flush-mounted automatic ceiling air intake for an agricultural building with a well ventilated attic, a room below the attic, a ceiling between the attic and the room with a ceiling opening therein and an exhaust fan in the building to remove air from the room, the air intake being adapted to permit large capacities of fresh air from the attic to be drawn through the intake into the room under the influence of the building exhaust fan, comprising:

(a) a rectangular plastic frame insertable into the ceiling opening and fastenable thereat;
   (b) a central frame opening for permitting fresh air to pass therethrough and a cross member on the frame extending across and dividing the frame opening forming two substantially equal baffle openings;
   (c) a recessed, inwardly projecting flange on the frame around portions of the frame opening adapted to form a baffle seat; and
   (d) two baffles each pivotally mounted along the cross member and opposing each other and each baffle being adapted to rest in the baffle seat, to close one of the baffle openings and to swing downwardly and outwardly to permit air to pass from the attic, through the intake central frame opening and into the room in opposite directions under the influence of the building exhaust fan.

2. The air intake of claim 1, further comprising an upwardly directed flange on the frame for mounting and supporting an upwardly projecting attic housing which functions as an insulation barrier having an open top and an open bottom.

3. The air intake of claim 2 wherein the attic housing mounts over the upwardly directed flange.

4. The air intake of claim 2 wherein the attic housing is collapsible.

5. The air intake of claim 2 wherein the attic housing is made of corrugated plastic.

6. The air intake of claim 1, further comprising an outwardly extending, flush-mount ceiling lip on the frame engagable with the room side of the ceiling and fastenable thereat thereby closing the ceiling opening.

7. The air intake of claim 6 wherein the ceiling lip extends all around the frame.

8. The air intake of claim 1, further comprising two pivot pins, one for each of the baffles, each pin rotatably mounted in the baffle seat and extending along the cross member secured to an edge of one of the baffles.

9. The air intake of claim 8, further comprising an intermediate baffle mounting plate on the pivot pin and a plate mounting slit in the baffle along the edge for receiving the mounting plate and securing the baffle to the pivot pin.

10. The air intake of claim 1 wherein the baffle seat flange extends all around the frame opening.

11. The air intake of claim 1, wherein the baffles each have an inward side supporting an adjustable spring mount bracket and a spring connected to the bracket and the cross member.

12. The air intake of claim 1, further comprising a pivot pin for each baffle rotatably mounted in the baffle seat along the cross member and secured to an inward edge of the associated baffle.

13. The air intake of claim 12, further comprising an intermediate baffle mounting plate on each pivot pin and a plate mounting slit in each baffle along the inward edge for receiving the mounting plate and securing the baffle to the pivot pin.

14. A corrosion-free, condensation-free, flush-mounted automatic ceiling air intake for an agricultural building with a well ventilated attic, a room below the attic, a ceiling between the attic and the room with a ceiling opening therein and an exhaust fan in the building to remove air from the room, the air intake being adapted to permit large capacities of fresh air from the attic to be drawn through the intake into the room under the influence of the building exhaust fan, comprising:

(a) a rectangular plastic frame insertable into the ceiling opening and fastenable thereat;

(b) an upwardly directed flange on the frame for mounting and supporting an upwardly projecting attic housing which functions as an insulation barrier having an open top and an open bottom;

(c) an outwardly extending flush-mount ceiling lip on the frame engagable with the room side of the ceiling and fastenable thereat thereby closing the ceiling opening;

(d) a central frame opening for permitting fresh air to pass therethrough;

(e) a recessed, inwardly projecting flange on the frame around the frame opening adapted to form a baffle seat; and (f) a cross member on the frame extending across and dividing the frame opening at the baffle seat flange forming two substantially equal baffle openings; and (g) two baffles each pivotally mounted along the cross member and opposing each other and each baffle being adapted to rest in the baffle seat, to close one of the baffle openings and to swing downwardly and outwardly to permit air to pass from the attic, through the intake and into the room in opposite directions under the influence of the building exhaust fan.

15. The air intake of claim 14, further comprising a pin for each baffle rotatably mounted in the baffle along the cross member and secured to an inward edge the associated baffle.

16. The air intake of claim 14, further comprising an intermediate baffle mounting plate on each pivot pin and a plate mounting slit in each baffle along the inward edge for receiving the mounting plate and securing the baffle to the pivot pin.

* * * * *

UNITED STATES PATENT AND TRADEMARK OFFICE
CERTIFICATE OF CORRECTION

PATENT NO. : 5,236,391
DATED : August 17, 1993
INVENTOR(S) : Ronald E. Schaefer

It is certified that error appears in the above-indentified patent and that said Letters Patent is hereby corrected as shown below:

Column 1, line 46, please insert a period after "ceiling and wall".

Column 8, lines 28-29, between "a" and "pin", please insert the word --pivot--.

Signed and Sealed this

Twenty-ninth Day of March, 1994

Attest:

BRUCE LEHMAN

Attesting Officer     Commissioner of Patents and Trademarks